United States Patent [19]

Chen

[11] Patent Number: 5,334,479
[45] Date of Patent: Aug. 2, 1994

[54] PROCESSES FOR AQUABULK POLYMERIZATION TO PRODUCE HIGH PURITY TONERS

[75] Inventor: Allan K. Chen, Oakville, Canada

[73] Assignee: Xerox Corporation, Stamford, Conn.

[21] Appl. No.: 872,477

[22] Filed: Apr. 23, 1992

[51] Int. Cl.$^5$ .............................................. G03G 5/00
[52] U.S. Cl. .................................................... 430/137
[58] Field of Search ........................................ 430/137

[56] References Cited

U.S. PATENT DOCUMENTS

| | | | |
|---|---|---|---|
| 4,190,717 | 2/1980 | Suzuki et al. | 526/62 |
| 4,465,756 | 8/1984 | Mikami et al. | 430/138 |
| 4,617,249 | 10/1986 | Ober et al. | 430/137 |
| 4,659,641 | 4/1987 | Manalek et al. | 430/137 |
| 4,727,011 | 2/1988 | Mahabadi et al. | 430/138 |
| 4,816,366 | 3/1989 | Hyosu et al. | 430/137 |
| 4,849,316 | 7/1989 | Kawasaki et al. | 435/106.6 |
| 4,894,309 | 1/1990 | Georges et al. | 430/137 |
| 4,971,879 | 11/1990 | Kimura | 430/106.6 |

Primary Examiner—John Kight, III
Assistant Examiner—Richard Jones
Attorney, Agent, or Firm—E. O. Palazzo

[57] ABSTRACT

A surfactant stabilizer free heat transfer bulk polymerization process for the preparation of a polymer or polymers which comprises adding water to a reaction vessel; heating the reaction vessel; adding to the reaction vessel a solution of monomer or monomers and initiators; heating the reaction vessel contents; increasing the temperature in the reaction vessel to from between about 95° to about 105° C. thereby removing water therefrom; and subsequently further heating the vessel contents to an effective temperature to enable said polymer or said polymers.

21 Claims, No Drawings

PROCESSES FOR AQUABULK POLYMERIZATION TO PRODUCE HIGH PURITY TONERS

BACKGROUND OF THE INVENTION

The invention is generally directed to processes for the preparation of toner and developer compositions, and more specifically, the present invention is directed to the preparation of polymers by an aquabulk polymerization, that is heat transfer bulk polymerizations wherein surfactants and stabilizers are avoided. In one embodiment, the process of the present invention comprises adding water to a reaction vessel, heating the reaction vessel, subsequently adding to the reaction vessel a solution of monomers and initiator; heating the contents of the reaction vessel for an effective time period, followed by the removal of water; thereafter further heating to about the melt temperature of polymer, subsequently adding to the molten melt mixed polymer product pigments and optional additives such as charge control agents. The polymer product, such as styrene acrylates, styrene methacrylates, styrene butadienes, polyesters, and the like can be selected as a toner resin. In embodiments, the toner compositions can be comprised of the polymer products obtained with the processes of the present invention, pigment particles, and optional known additives, such as charge additives like quaternary ammonium hydrogen bisulfates, including distearyl methyl hydrogen ammonium bisulfate, distearyl dimethyl ammonium methyl sulfate and the like. Also, the aforementioned toner compositions usually contain pigment particles comprised of, for example, carbon black, like REGAL 330 ®, magnetites, or mixtures thereof, cyan, magenta, yellow, blue, green, red, or brown components, or mixtures thereof thereby providing for the development and generation of black and/or colored images. The toner compositions of the present invention in embodiments thereof possess excellent admix characteristics, and maintain their triboelectric charging characteristics for an extended number of imaging cycles, exceeding for example 1,000,000 in a number of embodiments. The toner and developer compositions of the present invention can be selected for electrophotographic, especially xerographic imaging and printing processes, including color processes.

Certain suspension polymerization processes for the preparation of polymers are known, wherein there are suspended monomers in droplet form in a nonsolvent liquid thereof such as water, and adding thereto two types of suspending components, such as a protective colloid like ALKANOL TM a sulfonated surfactant, and a finely divided insoluble inorganic salt like tricalcium phosphate to minimize and stabilize the coalescence of the droplets. In suspension polymerization process, there is provided an aqueous phase comprising an aqueous mixture comprising water, monomers such as styrene monomer, butadiene monomer and the like, a suspension stabilizing agent, and a chain propagating amount of one or more free radical polymerization initiators, the ratio of the comonomer being, for example, between about 80:20 and about 95:5 by weight, the weight proportion of water to the combination of comonomers being between about 0.8:1 and about 2:1 and thereafter heating the aqueous phase to a temperature between about 50° C. and about 130° C. at a pressure between about 20 psi and about 140 psi when, for example, butadiene monomer is selected until at least about 90 percent by weight of the monomers are copolymerized to form an aqueous suspension of discrete copolymer particles. Examples of disadvantages associated with suspension polymerization include forming a suspension that entraps some of the stabilizer; and heating, for example, to 95° C., and forming a styrene butadiene copolymer with an undesirable high ash content (TCP), that is for example the ash content is from about 0.04 percent to about 0.15 percent. With undesirable ash content there can result toners with polymers that exhibit undesirable admix characteristics. Also, without the surfactant the monomers oil droplets will eventually coalesce, and suspension failure will result.

In patentability search reports the following United States patents were listed: U.S. Pat. No. 4,528,321, which discloses a polymer dispersing system comprising a polymerization stabilizer and a nonionic compound, such as alkanols, polyalkylene glycol monoethers, alkonates, and benzyl alcohol, reference for example column 3; U.S. Pat. No. 4,659,641 discloses an improved process for the preparation of resin particles by bead polymerization, see the Abstract of the Disclosure for example; U.S. Pat. No. 4,816,366 discloses processes for the preparation of toners by certain suspension polymerization methods, see for example the Abstract of the Disclosure, and column 3; and U.S. Pat. Nos. 4,617,249; 4,849,316 and 4,971,879. The disclosures of each of the aforementioned patents are totally incorporated herein by reference.

In U.S. Pat. No. 4,507,378 there is illustrated a process for the preparation of toner compositions for electrophotography which involves polymerizing an aqueous suspension of a monomer such as styrene in the presence of a dispersant which includes a phosphate compound. According to the disclosure of this patent, once polymerization occurs the dispersant is removed by adding a dilute acid and a final product is obtained subsequent to rinsing with water. Furthermore, in U.S. Pat. No. 4,659,641, the disclosure of which is totally incorporated herein by reference, there is illustrated a polymerization process for toner resin compositions, reference Example I, wherein a styrene n-butyl methacrylate copolymer with 2 percent wax is dispersed in water. A suspending agent, such as tricalcium phosphate, and a surfactant in a monomer solution can be added to the initial mixture with a polymerization initiator such as benzoylperoxide. After polymerization occurs, nitric acid is added to remove the tricalcium phosphate and the final product is filtered, washed, and dried. In U.S. Pat. No. 4,894,309, the disclosure of which is totally incorporated herein by reference, there is illustrated a polymerization process for the preparation of crosslinked copolymers for toner resin compositions, reference Example I, wherein a styrene butadiene copolymer crosslinked with divinylbenzene is formed in an aqueous phase of tricalcium phosphate and an ALKANOL TM. After polymerization occurs, nitric acid is added to remove the tricalcium phosphate and the final product is filtered, washed, and dried.

Although the above-mentioned processes for preparing polymer particles may be suitable for their intended purposes in most instances, there remains a need for processes wherein there can be obtained polymer products of high purity, that is for example with no ash in the polymer resulting from the use of surfactant like tricalcium phosphate (TCP).

Bulk polymerization processes for the preparation of toner polymers are known. These processes involve charging monomers and initiator into a reactor vessel with no water as a heat transfer medium. The heat capacity of water is 1 whereas the heat capacity of monomers is 0.5. In bulk polymerization, the concentration of monomers is higher when compared to aquabulk or suspension polymerizations. Therefore, these processes are less effective in removing heat from the bulk polymerization by a factor of, for example, 2 as compared to the polymerization processes of the present invention wherein water is selected. Also, with these processes usually a lower temperature profile of around 50° to 60° C. is selected thereby requiring longer reaction times, for example twice as long as the processes of the present invention in embodiments to complete the polymerization.

The aforementioned and other disadvantages are avoided or minimized with the processes of the present invention. Other process advantages associated with the present invention include the avoidance of washing the resulting polymer with, for example, nitric acid for surfactant and stabilizer, such as TCP removal; no water rinsing is needed to remove the nitric acid and TCP solution from the polymer; solid/liquid polymer separation process like filtration can be avoided; drying of the polymer product is not needed; acid waste generation is avoided or minimized; and in the preparation of toner compositions, melt compounding of the molten polymer obtained with toner pigments/additives in the reactor on completion of polymerization eliminates the conventional extrusion blending.

Developer compositions with charge enhancing additives, which impart a positive charge to the toner resin, are known. Thus, for example, there is described in U.S. Pat. No. 3,893,935 the use of quaternary ammonium salts as charge control agents for electrostatic toner compositions, U.S. Pat. No. 4,221,856 which discloses electrophotographic toners containing resin compatible quaternary ammonium compounds in which at least two R radicals are hydrocarbons having from 8 to about 22 carbon atoms, and each other R is a hydrogen or hydrocarbon radical with from 1 to about 8 carbon atoms, and A is an anion; a similar teaching is presented in U.S. Pat. No. 4,312,933 which is a division of U.S. Pat. No. 4,291,111; and related teachings are presented in U.S. Pat. No. 4,291,112 wherein A is an anion including, for example, sulfate, sulfonate, nitrate, borate, chlorate, and the halogens.

Also, there is disclosed in U.S. Pat. No. 4,338,390, the disclosure of which is totally incorporated herein by reference, developer compositions containing as charge enhancing additives organic sulfate and sulfonates, which additives can impart a positive charge to the toner composition. Further, there are disclosed in U.s. Pat. No. 4,298,672, the disclosure of which is totally incorporated herein by reference, positively charged toner compositions with resin particles and pigment particles, and as charge enhancing additives alkyl pyridinium compounds. Additionally, other documents disclosing positively charged toner compositions with charge control additives include U.S. Pat. Nos. 3,944,493; 4,007,293; 4,079,014; 4,394,430, and 4,560,635 which illustrates a toner with a distearyl dimethyl ammonium methyl sulfate charge additive. The disclosures of each of the patents mentioned herein are totally incorporated herein by reference.

Moreover, toner compositions with negative charge enhancing additives are known, reference for example U.S. Pat. Nos. 4,411,974 and 4,206,064, the disclosures of which are totally incorporated herein by reference. The '974 patent discloses negatively charged toner compositions comprised of resin particles, pigment particles, and as a charge enhancing additive ortho-halo phenyl carboxylic acids. Similarly, there are disclosed in the '064 patent toner compositions with chromium, cobalt, and nickel complexes of salicylic acid as negative charge enhancing additives.

Toners with quaternary ammonium bisulfates are illustrated in U.S. Pat. No. 4,937,157, the disclosure of which is totally incorporated herein by reference, which bisulfates can be of the formula $R'_2R''_2N+X-(R_4N)+X-$ wherein $R'$ is aryl, substituted aryl such as alkylaryl, alkyl, preferably with 1 to about 30 carbon atoms, such as methyl, ethyl, propyl, butyl, hexyl, heptyl, and preferably dimethyl dialkyl ammonium bisulfate compounds where the dialkyl radicals are from about 10 to about 30 carbon atoms, and more preferably dialkyl radicals with from about 14 to about 22 carbon atoms; $R''$ is aryl, substituted aryl such as alkylaryl, alkyl, preferably containing from 1 to about 18 carbon atoms; and $X-$ is a bisulfate ($HSO_4$) anion.

SUMMARY OF THE INVENTION

It is an object of the present invention to provide processes for the preparation of polymers, which processes have many of the advantages illustrated herein.

In another object of the present invention there are provided processes for the preparation of polymers with a high purity of, for example, from about 99 to about 100 percent since minimal or no ash resulting from tricalcium phosphate and similar surfactants is present therein.

In another object of the present invention there are provided processes for the preparation of polymers wherein surfactants and stabilizers are avoided.

In yet another object of the present invention there are provided economical aquabulk, that is heat transfer, polymerization processes for the preparation of polymers.

In embodiments the present invention is directed to the preparation of polymers, and toner compositions thereof comprised of said polymers, pigment particles, and optional charge enhancing additives as illustrated in the U.S. patents mentioned herein, such as quaternary ammonium hydrogen bisulfates, or tetra alkyl ammonium sulfonates. More specifically, the present invention in embodiments is directed to processes for the preparation of polymers which comprise providing a reaction vessel; adding to the vessel water; heating the water; adding to the vessel a solution of monomer, or monomers and initiators; heating the vessel contents to, for example, from about 80° to about 95° C.; increasing the temperature to from about above 95° to about 105° C. thereby removing water therefrom; heating the vessel contents to an effective temperature of, for example, from about 140° to about 160° C. to enable a molten polymer; followed by cooling and isolation of the polymer product. The process of the present invention comprises (1) adding water in an effective amount of, for example, in the range of 20 to 60 percent of the total amount of the reactor vessel contents and preferably about 40 percent of the total charge to a suitable reactor, for example, with a size or capacity of 1 liter to about 2 liter vessel, agitating with an anchor helix electrical motor driven stirrer operating at, for example, about 30 rpm to about 600 rpm, and heating the water to a temperature of from about 30° C. to about 110° C.; (2) adding to the aforementioned deionized water 40 to 80 percent of monomers premixed with initiators, thus forming a dispersion of the monomers and initiators of oil droplets not miscible with water and which droplets contain no surfactant, and no stabilizer; (3) initiating polymerization at a temperature of from about 30° C. to about 110° C. and continuing polymerization for between about 1 minute to 4 hours; (4) maintaining agitation of the reactor contents to about 1 rpm to about 60 rpm; (5) removing water by, for example, simple distillation process or vacuum distillation process; (6) then heating the reactor contents to a temperature of from about 100° C. to about 200° C. and retaining the reaction mixture at this temperature for between about 1 hour to about 6 hours for completion of polymerization and formation of a molten polymer form; (7) adding to the molten polymer, while maintaining the reactor temperature at about 140° C. to 180° C., an effective amount of toner pigments and toner additives from about 1 percent to about 40 percent by weight of the polymer; (8) melt mixing for from about 15 minutes to about 5 hours to disperse the toner pigments and toner additives; and (9) discharging by, for example, a gravity drop at the bottom of the reactor drain valve or by pressurizing the reactor with 50 kPa of nitrogen pressure the polymeric toner product composite from the reaction vessel. The aforementioned formed toner polymer can be identified by Gel analysis as having a high viscosity of from between about 10,000 to about 100,000 centipoise in embodiments.

Embodiments of the present invention include a surfactant stabilizer free heat transfer bulk polymerization process for the preparation of a polymer or polymers which comprises adding water to a reaction vessel; heating the reaction vessel; adding to the reaction vessel a solution of monomer or monomers and initiators; heating the reaction vessel contents; increasing the temperature in the reaction vessel to from between about 95° to about 105° C. thereby removing water therefrom; and subsequently further heating the vessel contents to an effective temperature to enable said polymer or said polymers; and a surfactant stabilizer free heat transfer bulk polymerization process for the preparation of a polymer or polymers which comprises adding water to a reaction vessel; heating the water; adding to the vessel a solution of monomers and initiators; heating the vessel contents to from about 85° to about 90° C; increasing the temperature of the reaction vessel contents to from between about 96° to about 105° C. thereby removing water by distillation therefrom; thereafter heating the vessel contents to a temperature of from between about 140° to about 160° C. to enable a molten polymer; removing the resulting hot viscous molten polymer from the reactor; and cooling wherein there results a polymer product or polymer products with substantially no ash present therein.

Illustrative examples of monomer or comonomers selected for the processes of the present invention and present in effective amounts of, for example, from about 1 percent to about 99 percent by weight and preferably monomers about 40 to about 80 percent and water about 20 to about 60 percent, based on the amount of water and monomer present, include vinyl monomers such as styrene, alpha-methylstyrene, p-chlorostyrene and the like; monocarboxylic acids and their derivatives such as acrylic acid, methyl acrylate, ethyl acrylate, butyl acrylate, dodecyl acrylate, octyl acrylate, phenyl acrylate, methacrylic acids, methyl methacrylate, ethyl methacrylate, butyl methacrylate, octyl methacrylate, acrylonitrile and acrylamide; dicarboxylic acids with a double bond and their derivatives such as maleic acid, monobutyl maleate, dibutyl maleate, vinyl esters such as vinyl chloride, vinyl acetate and vinyl benzoate; vinyl ketones such as vinyl methyl ketone and vinyl ether ketone; and vinyl ethyl ether and vinyl isobutyl ether; vinyl naphthalene; unsaturated monoolefins such isobutylene and the like; vinylidene halides such as N-vinyl pyrrole and the like; butadiene and isoprene monomers; and mixtures thereof. In one embodiment, there is selected a monomer of styrene and a monomer of n-butyl methacrylate, n-hexyl methacrylate or butadiene copolymer with from about 60 to about 95 percent by weight of styrene.

Illustrative examples of initiator present in effective amounts of, for example, from about 0.5 percent to 10 percent by weight of monomers, include azo compounds such as azoisobutyrylnitrile, azodimethylvaleronitrile, azobiscyclohexanitrile, 2-methylbutyrylnitrile, diazoamine-azobenzene, mixtures thereof, and the like; peroxide initiators such as lauroyl peroxide, benzoyl peroxide, acetyl peroxide, decanoyl peroxide mixtures thereof, and the like; carbonate initiators such as 0,0-t-butyl-0-(2-ethylhexyl) monoperoxycarbonate, 0,0-t-amyl-0-(2-ethylhexyl) monoperoxycarbonate, peroxydicarbonates, other known initiators, and the like. The polymerization temperature is usually selected according to the initiator types, and this temperature in embodiments is in the range of from about 50° C. to about 130° C. Generally, the molecular weight of polymer decreases to from between about 10,000 to about 200,000 as the amount of initiator, from between about 0.5 to about 8 percent, or polymerization temperature, from between about 50° C. to 130° C., increases. The polymerization temperature, initiator types and concentration can be selected to obtain polymer with a weight, as determined by analytical analysis using Gel Permeation Chromatography GPC methods, average molecular weight in the range of 10,000 to about 200,000.

Examples of reactors include 316 Stainless Steel reactors, available from American Reactor Inc, with, for example, a size ranging from 2 liters to 8 liters. Examples of heating sources include electrical elements with a 20 Kilowatt electrical heater with Sunco 21 heat transfer oil as a heating media, while examples of cooling sources include water and examples of stirrers include 316 stainless steel pitched helix anchor blade mixers. Also, the toner obtained can be subjected to known coarse grinding, particle size reduction using a Fitzmill to reduce the solids to, for example, about 850 microns or less, followed by fine grinding in a Sturtevant mill to break down the toners into smaller particles of about 3 to 12 microns in volume average diameter and subsequently classification.

Illustrative examples of polymers obtained with the processes of the present invention include styrene n-butylmethacrylate copolymers, styrene n-hexylmethacrylate copolymers and styrene butadiene copolymers, such as styrene, 58 weight percent, and n-butylmethacrylate, 42 weight percent; styrene, 73 weight percent, and n-hexylmethacrylate, 27 weight percent, for a styrene n-hexylmethacrylate copolymer; styrene, 87 weight percent, and butadiene, 13 weight percent, and generally, polyamides, polyolefins, styrene acrylates, styrene methacrylate, styrene butadienes, crosslinked styrene polymers, epoxies, polyurethanes, vinyl resins, including homopolymers or copolymers of two or more vinyl monomers; and polymeric esterification products of a dicarboxylic acid and a diol comprising a diphenol. Vinyl monomers include styrene, p-chlorostyrene, unsaturated mono-olefins such as ethylene, propylene, butylene, isobutylene and the like; saturated mono-olefins such as vinyl acetate, vinyl propionate, and vinyl butyrate; vinyl esters like esters of monocarboxylic acids including methyl acrylate, ethyl acrylate, n-butyl acrylate, isobutyl acrylate, dodecyl acrylate, n-octyl acrylate, phenyl acrylate, methyl methacrylate, ethyl methacrylate, and butyl methacrylate; acrylonitrile, methacrylonitrile, acrylamide; mixtures thereof; and the like. Examples of specific polymers include styrene butadiene copolymers with a styrene content of from about 70 to about 95 weight percent, reference the U.S. patents mentioned herein, the disclosures of which have been totally incorporated herein by reference.

As one toner polymer resin, there are prepared the esterification products of a dicarboxylic acid and a diol comprising a diphenol. These resins are illustrated in U.S. Pat. No. 3,590,000, the disclosure of which is totally incorporated herein by reference. Other specific polymers obtained with the processes of the present invention include styrene/methacrylate copolymers, and styrene/butadiene copolymers; PLIOLITES®; suspension polymerized styrene butadienes, reference U.S. Pat. No. 4,558,108, the disclosure of which is totally incorporated herein by reference; polyester resins obtained from the reaction of bisphenol A and propylene oxide; followed by the reaction of the resulting product with fumaric acid, and branched polyester resins resulting from the reaction of dimethylterephthalate, 1,3-butanediol, 1,2-propanediol, and pentaerythritol, styrene acrylates, and mixtures thereof.

The toner compositions can be prepared by a number of known methods such as admixing and heating the resin polymer particles obtained such as styrene butadiene copolymers, pigment particles such as magnetite, carbon black, or mixtures thereof, and preferably from about 0.5 percent to about 5 percent of the aforementioned charge enhancing additives, or mixtures of charge additives in a toner extrusion device, such as the ZSK53 available from Werner Pfleiderer, and removing the formed toner composition from the device. Subsequent to cooling in water, the toner composition is subjected to grinding utilizing, for example, a Sturtevant micronizer for the purpose of achieving toner particles with a volume median diameter of less than about 25 microns, and preferably of from about 8 to about 12 microns, which diameters are determined by a Coulter Counter. Subsequently, the toner compositions can be classified utilizing, for example, a Donaldson Model B classifier for the purpose of removing fines, that is toner particles less than about 4 microns volume median diameter.

The polymer particles are present in a sufficient, but effective amount, for example from about 70 to about 90 weight percent. Thus, when 1 percent by weight of the charge enhancing additive is present, and 10 percent by weight of pigment or colorant, such as carbon black, is contained therein, about 89 percent by weight of resin is selected. Also, the charge enhancing additive of the present invention may be coated on the pigment particle. When used as a coating, the charge enhancing additive of the present invention is present in an amount of from about 0.1 weight percent to about 5 weight percent, and preferably from about 0.3 weight percent to about 1 weight percent.

Numerous well known suitable pigments or dyes can be selected as the colorant for the toner particles including, for example, carbon black like REGAL 330®, nigrosine dye, aniline blue, magnetite, or mixtures thereof. The pigment, which is preferably carbon black, should be present in a sufficient amount to render the toner composition colored. Generally, the pigment particles are present in amounts of from about 1 percent by weight to about 20 percent by weight, and preferably from about 2 to about 10 weight percent based on the total weight of the toner composition; however, lesser or greater amounts of pigment particles may be selected.

When the pigment particles are comprised of magnetites, thereby enabling single component toners in some instances, which magnetites are a mixture of iron oxides ($FeO \cdot Fe_2O_3$) including those commercially available as MAPICO BLACK® they are present in the toner composition in an amount of from about 10 percent by weight to about 70 percent by weight, and preferably in an amount of from about 10 percent by weight to about 50 percent by weight. Mixtures of carbon black and magnetite with from about 1 to about 15 weight percent of carbon black, and preferably from about 2 to about 6 weight percent of carbon black, and magnetite, such as MAPICO BLACK®, in an amount of, for example, from about 5 to about 60, and preferably from about 10 to about 50 weight percent can be selected.

There can also be blended with the toner compositions external additive particles including flow aid additives, which additives are usually present on the surface thereof. Examples of these additives include colloidal silicas such as AEROSIL®, available from Degussa Company, metal salts and metal salts of fatty acids inclusive of zinc stearate, metal oxides like aluminum oxides, cerium oxides, and mixtures thereof, which additives are generally present in an amount of from about 0.1 percent by weight to about 5 percent by weight, and preferably in an amount of from about 0.1 percent by weight to about 1 weight percent. Several of the aforementioned additives are illustrated in U.S. Pat. Nos. 3,590,000 and 3,800,588, the disclosures of which are totally incorporated herein by reference.

With further repect to the toners, colloidal silicas such as AEROSIL® can be surface treated with known charge additives in an amount of from about 1 to about 30 weight percent and preferably 10 weight percent followed by the addition thereof to the toner in an amount of from 0.1 to 10 and preferably 0.1 to 1 weight percent.

Also, there can be included in the toner compositions low molecular weight waxes, such as polypropylenes and polyethylenes commercially available from Allied Chemical and Petrolite Corporation, Epolene N-15 commercially available from Eastman Chemical Products, Inc., Viscol 550-P, a low weight average molecular weight polypropylene available from Sanyo Kasei K.K., and similar materials. The commercially available polyethylenes selected have a molecular weight of from about 1,000 to about 1,500, while the commercially available polypropylenes utilized for the toner compositions of the present invention are believed to have a molecular weight of from about 4,000 to about 5,000. Many of the polyethylene and polypropylene compositions useful in the present invention are illustrated in British Patent No. 1,442,835, the disclosure of which is totally incorporated herein by reference. The low molecular weight wax materials can be present in the toner composition in various amounts, however, generally these waxes are present in the toner composition in an amount of from about 1 percent by weight to about 15 percent by weight, and preferably in an amount of from about 2 percent by weight to about 10 percent by weight.

Encompassed within the scope of the present invention are colored toner and developer compositions comprised of toner polymer particles obtained with the aquabulk processes as illustrated herein, optional carrier particles, the charge enhancing additives illustrated herein, and as pigments or colorants known red, blue, green, brown, magenta, cyan and/or yellow particles, as well as mixtures thereof. The aforementioned pigments are incorporated into the toner composition in various suitable effective amounts providing the objectives of the present invention are achieved. In one embodiment, these colored pigment particles are present in the toner composition in an amount of from about 2 percent by weight to about 15 percent by weight calculated on the weight of the toner resin particles.

For the formulation of developer compositions, there are mixed with the toner particles carrier components, particularly those that are capable of triboelectrically assuming an opposite polarity to that of the toner composition. Accordingly, the carrier particles can be selected to be of a negative polarity enabling the toner particles, which are positively charged, to adhere to and surround the carrier particles. Illustrative examples of carrier particles include iron powder, steel, nickel, iron, ferrites, including copper zinc ferrites, copper zinc magnesium ferrites, available from Steward Chemicals, and the like. Additionally, there can be selected as carrier particles nickel berry carriers as illustrated in U.S. Pat. No. 3,847,604, the disclosure of which is totally incorporated herein by reference. The selected carrier particles can be used with or without a coating, the coating generally containing terpolymers of styrene, methylmethacrylate, and a silane, such as triethoxy silane, reference U.S. Pat. Nos. 3,526,533 and 3,467,634, the disclosures of which are totally incorporated herein by reference; polymethyl methacrylates; other known coatings; and the like. The carrier particles may also include in the coating, which coating can be present in one embodiment in an amount of from about 0.1 to about 3 weight percent, conductive substances such as carbon black in an amount of from about 5 to about 30 percent by weight. Polymer coatings not in close proximity in the triboelectric series can also be selected, reference U.S. Pat. Nos. 4,937,166 and 4,935,326, the disclosures of which are totally incorporated herein by reference, including for example KYNAR ® and polymethylmethacrylate mixtures (40/60). Coating weights can vary as indicated herein; generally, however, from about 0.3 to about 2, and preferably from about 0.5 to about 1.5 weight percent coating weight is selected.

Furthermore, the diameter of the carrier particles, preferably spherical in shape, is generally from about 50 microns to about 1,000 microns, and preferably from about 75 to about 200 microns. The carrier component can be mixed with the toner composition in various suitable combinations, for example from about 1 to 5 parts per toner to about 100 parts to about 200 parts by weight of carrier are selected.

The toner and developer compositions of the present invention may be selected for use in electrostatographic imaging and printing apparatuses containing therein photoreceptors providing that they are capable of being charged negatively. Thus, the toner and developer compositions of the present invention can be used with layered photoreceptors that are capable of being charged negatively, such as those described in U.S. Pat. No. 4,265,990, the disclosure of which is totally incorporated herein by reference.

The following Examples are being supplied to further define various species of the present invention, it being noted that these Examples are intended to illustrate and not limit the scope of the present invention. Parts and percentages are by weight unless otherwise indicated. A Comparative Example and data are also provided.

EXAMPLE I

A one liter glass reactor was charged with 133 milliliters of deionized water. The reactor charging port was then closed and the reactor was purged with 100 percent of purified nitrogen at a flow rate of about 5 cubic feet per hour (SCFH) and nitrogen was introduced while the reactor was heated to 85° C. with stirring with a glass stirrer operated by a motor at about 600 rpm. This reactor was equipped with a reflux condenser to prevent loss of water during reaction. As the reactor was heated, 78.3 grams of styrene and 29.2 grams of n-hexylmethacrylate were mixed together and into which 5.6 grams of 78 percent benzoyl peroxide were added, which components were mixed until all the benzoyl peroxide was dissolved. When the reactor temperature reached 85° C., the aforementioned dissolved monomers and initiator mixture were added into the reactor vessel over a 10 minute period. After the addition was completed, the reactor was purged with purified nitrogen for about 5 minutes. The reactor temperature was maintained by an electrical heating mantle and by setting a temperature controller at 85° C. for 2 hours, then the temperature was raised by setting the temperature controller temperature with heating elements to 105° C., and the reactor agitation was reduced to 10 rpm. Water in the reactor was distilled at a temperature of 105° C. for 2 hours by using a distillation condenser. The remaining organic mass in the reactor vessel was heated to 150° C., in one hour, and a molten polymer was obtained. The resulting polymer product of styrene n-hexylmethacrylate copolymer (73/27) was discharged; for this glass reactor there was no bottom valve to discharge the molten polymer, and the copolymer was poured out of the reactor from the top opening as is without any washing, filtration and drying. The identification of the resulting polymer product and the molecular weight were determined by GPC. This copolymer had a molecular weight ($M_w$) of 25,700, a number average molecular weight ($M_n$) of 9,200, a molecular weight distribution $M_w/M_n$ of 2.8 (the number 25,700 divided by 9,200=2.8) determined by differential scanning colorimeter analysis DSC and a Tg of 53.3° C. There was zero ash detected in the polymer since there was no inorganic salt like TCP introduced into the reaction. Also, ash content can be measured by heating a 20 gram sample of the above copolymer product in a platinum crucible in a programmable muffle furnace. The furnace is programmed to heat the sample from 30° C. to 300° C. over 270 minutes and then heat it from 300° C. to 500° C. over 100 minutes, maintained at 500° C. for 30 minutes, heating from 500° C. to 800° C. over 60 minutes, held at 800° C. for 120 minutes, then cooled gradually over a period of about 8 to 10 hours to room temperature. The remaining ash left in the crucible is weighed and calculated as a percentage of the weight of the original 20 gram polymer sample.

EXAMPLE II

The process of Example I was repeated with the exception that the reactor mixing speed was 150 rpm, instead of 600 rpm to, for example, illustrate the effect, if any, of the reaction agitation on the molecular weight properties of the resulting copolymer. The reduction in reactor mixing with identical copolymerization parameters with the polymerization process of Example I provided a similar polymer product of styrene hexylmethacrylate copolymer (73/27) about 99.9 percent conversion. The resulting polymer had a molecular weight ($M_w$) of 24,800, a number average molecular weight ($M_n$) of 10,000, a molecular weight distribution ($M_w/M_n$) of 2.48 and a Tg of 55.6° C. There was zero ash in the above prepared polymer product as determined by anlytical methods, and as determined by repeating the process of Example I.

EXAMPLE III

The process of Example I was repeated with the exception that the reaction time at 85° C. for the polymerization was 1 hour. The resulting polymer had a molecular weight ($M_w$) of 24,100, a number average molecular weight ($M_n$) of 11,000 and a molecular weight distribution ($M_w/M_n$) of 2.19. There was zero percent ash in the polymer determined as indicated in Example I.

EXAMPLE IV

A one liter glass reactor was charged with 216.5 milliliters of deionized water. The reactor charging port was then closed and the reactor was purged with purified nitrogen introduced while the reactor was heated to 90° C. with stirring at about 300 rpm. This reactor was equipped with a reflux condenser to prevent loss of water during reaction. As the reactor was heated, 96.5 grams of styrene and 70.0 grams of n-butyl methacrylate were mixed together and into which 2.77 grams of 78 percent benzoyl peroxide were added, which components were mixed until dissolved. When the reactor temperature reached 90° C., the aforementioned dissolved prepared monomers and initiator mixture were added into the reactor vessel over a 10 minute period. After the addition was completed, the reactor was purged with purified nitrogen for about 5 minutes. The reactor temperature was maintained at 90° C. for 2 hours then the temperature was raised to 105° C., and the reactor agitation was reduced to 10 rpm. Water in the reactor was distilled by using a distillation condenser, which condenser was maintained at 8° C. cold water temperature and the distillation temperature was 105° C. for 2 hours. The remaining organic mass in the reactor vessel was heated to 150° C., in one hour, and a molten polymer was obtained. The resulting polymer product with no ash (58/42) (a viscous molten polymer mass having a viscosity of about 10,000 to 100,000 centipoise) was discharged at about 140° C. to 180° C. as is without washing, filtration and drying. The resulting polymer had a molecular weight ($M_w$) of 65,300, a number average molecular weight ($M_n$) of 33,200, a molecular weight distribution ($M_w/M_n$) of 1.97 and a Tg of 57° C.

EXAMPLE V

A one liter glass reactor was charged with 139.7 milliliters of deionized water. The reactor charging port was then closed and the reactor was purged with purified nitrogen being introduced while the reactor was heated to 90° C. with stirring at about 300 rpm. This reactor was equipped with a reflux condenser to prevent loss of water during the reaction. As the reactor was heated, 62.3 grams of styrene and 45.2 grams of n-butyl methacrylate were mixed together and into which 1.79 grams of 78 percent benzoyl peroxide were added, which components were mixed until dissolved. When the reactor temperature reached 90° C., the aforementioned prepared monomers and initiator mixture were added into the reactor vessel over a 10 minute period. After the addition was completed, the reactor was purged with purified nitrogen for about 5 minutes. The reactor temperature was maintained at 90° C. for 2 hours then the temperature was raised to 105° C., and the reactor agitation was reduced to 10 rpm. Water in the reactor was distilled by using a distillation condenser, which distillation was accomplished at a temperature of 105° C. for 2 hours. The remaining organic mass was heated to 150° C., in an hour, and a molten polymer was obtained. The resulting polymer product of styrene n-butylmethacrylate copolymer (58/42) was discharged as is without washing, filtration and drying. The resulting polymer had a molecular weight ($M_w$) of 57,200, a number average molecular weight ($M_n$) of 26,200, a molecular weight distribution ($M_w/M_n$) of 2.18 and a Tg of 54.8° C. There was zero ash detected in the polymer product as determined by repeating the process of Example I.

For comparison, a suspension polymerization process employing the same chemical components of Example V was accomplished by charging a 1 liter glass reactor with 139.7 milliliters of deionized water, 0.62 gram of tricalcium phosphate, and 0.035 gram of alkylsodium naphthalene sulfonate (ALKANOL XC ™). The reactor charging port was then closed and the the reactor was purged with purified nitrogen introduced while the reactor was heated to 90° C. with stirring at about 300 rpm. This reactor was equipped with a reflux condenser to prevent loss of water during reaction. As the reactor was heated, 62.3 grams of styrene and 45.2 grams of n-butyl methacrylate were mixed together and into which 1.79 grams of 78 percent benzoyl peroxide were added, which components were mixed until dissolved. When the reactor temperature reached 90° C., the aforementioned prepared monomers and initiator mixture was added into the reactor vessel over a 10 minute period. After the addition was completed, the reactor was purged with purified nitrogen for about 5 minutes. The reactor temperature was maintained at 90° C. for about 4 hours. The reactor was then cooled to 20° C. The resulting polymer beads were washed with 1.0 normal nitric acid, then with water to remove undesirable ash and ALKANOL ™, collected by filtration and dried. The resulting polymer styrene n-butyl methacrylate (58/42) had a molecular weight ($M_w$) of 63,500, a number average molecular weight ($M_n$) of 30,100, a molecular weight distribution ($M_w/M_n$) of 2.11 and a Tg of 54.7° C. The polymer product had 0.05 percent ash as determined by the method of Example I.

EXAMPLE VI

In this Example, the polymerization process of Example I was essentially repeated and scaled up to a two liter stainless steel reactor. The reactor was charged with 419.1 milliliters of deionized water. The reactor charging port was then closed and the reactor was purged with purified nitrogen (for about 30 minutes) introduced while the reactor was heated to 90° C. with stirring at about 60 rpm using an anchor helix mixer. This reactor was equipped with a reflux condenser and a distillation condenser. As the reactor was heated, 186.9 grams of styrene and 135.6 grams of n-butylmethacrylate were mixed together and into which 5.37 grams of 78 percent benzoyl peroxide were added, which components were mixed until all benzoyl peroxide was dissolved. When the reactor temperature reached 90° C., the aforementioned prepared monomers and initiator mixture were added into the reactor vessel over a 10 minute period. After the addition was completed, the reactor was purged with purified nitrogen for about 5 minutes. The reactor temperature was held at 90° C. for 2 hours then the temperature was raised to 105° C., and the reactor agitation was reduced to 10 rpm. Water in the reactor was distilled by using a distillation condenser and a maintained temperature of 105° C. for 2 hours. The remaining organic mass was heated to 150° C., in one hour, and a molten polymer was obtained. The resulting polymer product of styrene n-butylmethacrylate copolymer (58/42) was discharged (at this stage the polymer was molten hot, 140° C. to 180° C., viscous liquid without washing, filtration and drying processes. The resulting polymer had a molecular weight ($M_w$) of about 57,000, a number average molecular weight ($M_n$) of about 26,000, a molecular weight distribution ($M_w/M_n$) of about 2.10 and a Tg of about 55° C. there was zero ash detected in the product as determined by the method of Example I.

EXAMPLE VII

The process of Example VI was repeated with the exception that the reactor bottom was heated to 160° C. at the end of the polymerization by an electrical heating mantle. Employing such technique, the molten polymer discharging process from the two liter reactor was facilitated. The resulting polymer had a molecular weight ($M_w$) of about 57,000, a number average molecular weight ($M_n$) of about 26,000, a molecular weight distribution ($M_w/M_n$) of about 2.10 and a Tg of about 55.0° C. There was zero ash in the product as determined analytically, and by the process of Example I.

EXAMPLE VIII

The process of Example I was repeated except that half of the deionized water was used during the polymerization step. After the water distillation process, up to the point of molten polymer in the reactor, there was added to the reactor about 35.8 grams of REGAL 300 ® carbon black pigment. The molten polymer and pigment were melt mixed and compounded in the reactor for 1 hour prior to being discharged into a metal container. The resulting toner obtained was ground with a Fitzmill to about 850 micron size particles and jet milled with Sturtevant grinding equipment. The resulting toner product had an average particle diameter size of 4.4 microns and a GSD of 1.27.

EXAMPLE IX

In this Example, the process of aquabulk polymerization of Example I was conducted in a two liter reactor using styrene and butadiene monomers. To 280 grams of styrene were added 11.438 grams of benzoyl peroxide and 1.462 grams of TBEC (0,0-t-butyl-0(2-ethylhexyl) monoperoxycarbonate), which components were mixed until dissolved. This mixture was then transferred to a 500 milliliter stainless steel pressure container and 40.9819 grams of butadiene were added to the container under nitrogen pressure. One hundred (100) milliliters of deionized water were charged into a 2 liter stainless steel reactor agitated at 60 rpm, and heated to 85° C. using a hot oil bath temperature controller. The container containing the styrene, butadiene and initiators was connected to the reactor with water via a ⅛ inch stainless steel tube. When the reactor temperature reached 85° C., the prepared monomer and initiator mixture was transferred into the water containing reactor vessel over a 10 minute period. The reactor was allowed to be pressurized during the monomer mixture addition. After the addition was completed, the reactor was pressurized to 300 kilopascals with nitrogen. The reactor temperature was held at 90° C. for 165 minutes, then the pressure in the reactor was slowly released. The reactor mixing speed was reduced to 10 rpm and the reactor temperature was elevated to 105° C. to distill all the water from the reactor via a distillation condenser. The water distillation process consumed about 1.5 hours. Once all of the water was removed from the reactor, the remaining organic mass was heated to form a molten polymer at a temperature of 160° C. The reactor contents were agitated for 2 hours at 160° C. before being discharged into a metal container. The resulting styrene butadiene (91/9) had a molecuar weight ($M_w$) of 31,600, a number average molecular weight ($M_n$) of 7,400, a molecular weight distribution ($M_w/M_n$) of 4.28 and a Tg of 51.8° C. There was zero ash in the product as determined by the method of Example I.

EXAMPLE X

The process of Example IX was repeated up to the point of the molten polymer being agitated for two hours at 160° C., whereupon about 12.54 grams of REGAL 330 ® Carbon Black, about 63.71 grams of MAPICO BLACK200 magnetite, about 0.9557 gram of DDAMS (distearyl dimethyl ammonium methyl sulfate) charge additive, and about 0.9557 gram of DDAB (distearyl dimethyl ammonium bisulfate) charge additive were added. The reactor mixture was compounded for 45 minutes at 160° C. before being discharged into a metal container. The resulting toner composite was ground with a Fitzmill to about 850 micron size particles and jet milled with a Sturtevant mill into a toner. The toner polymer had a molecular weight ($M_w$) of about 32,000, a number average molecular weight ($M_n$) of about 7,500, a molecular weight distribution ($M_w/M_n$) of about 4.20 and a Tg of about 52.0° C. The resulting toner product had an average particle diameter size of 6.3 microns and a GSD of 1.28.

Other modifications of the present invention may occur to those skilled in the art subsequent to a review of the present application. The aforementioned modifications, including equivalents thereof, are intended to be included within the scope of the present invention.

What is claimed is:

1. A surfactant stabilizer free heat transfer bulk polymerization process for the preparation of a high purity toner consisting essentially of adding water to a reaction vessel, which water is added in an amount of from about 20 to about 60 percent based on the reaction vessel contents; heating the reaction vessel at a temperature of from about 30° C. to about 110° C.; adding to the reaction vessel a solution of monomer or monomers and initiator or initiators; heating the reaction vessel contents at a temperature of from about 80° C. to about 95° C.; increasing the temperature in the reaction vessel to from between about 95° to about 105° C. thereby removing water therefrom; and subsequently further heating at a temperature of from about 140° C. to about 160° C. the vessel contents to enable a molten polymer product, subsequently adding pigment thereto followed by cooling.

2. A surfactant stabilizer free heat transfer bulk polymerization process for the preparation of a high purity toner consisting essentially of adding water to a reaction vessel, which water is added in an amount range of from about 20 to about 60 percent based on the amount of the reaction vessel contents; heating the water at a temperature of from about 30° C. to about 110° C.; adding to the vessel a solution of monomer or monomers and initiators; heating the vessel a contents to from about 85° to about 90° C.; increasing the temperature of the reaction vessel contents to from between about 96° to about 105° C. thereby removing water by distillation therefrom; thereafter heating the vessel contents to a temperature of from between about 140° to about 160° C. to enable a molten polymer; subsequently adding pigment thereto followed by cooling wherein there results a toner with a polymer and which polymer contains substantially no ash present therein; removing the resulting hot viscous molten polymer from the reaction vessel.

3. A process in accordance with claim 2 wherein the water is heated to a temperature of from about 80° to about 90° C.

4. A process in accordance with claim 2 wherein the water is deionized water and is heated to a temperature of from about 85° C. to about 105° C.

5. A process in accordance with claim 2 wherein the heating of water, and solution of monomers and initiators is accomplished for a period of from between about 1 to about 4 hours.

6. A process in accordance with claim 2 wherein the heating of water, and solution of monomers and initiators is accomplished for a period of about 2 hours.

7. A process in accordance with claim 2 wherein the distillation of the water is accomplished at about 105° C.

8. A process in accordance with claim 2 wherein the polymer is isolated by removal of water by distillation, and said water with residuals is recycled into said reactor vessel.

9. A process in accordance with claim 1 wherein the monomers are styrene acrylates, styrene methacrylates, styrene butadienes, or polyesters.

10. A process in accordance with claim 2 wherein the monomers are styrene acrylates, styrene methacrylates, styrene butadienes, or polyesters.

11. A process in accordance with claim 1 wherein the toner polymer is a styrene acrylate, a styrene methacrylate, a styrene butadiene, or a polyester.

12. A process in accordance with claim 2 wherein the initiators are benzoyl peroxide, (0,0-t-butyl-0 (2-ethylhexyl) monoperoxycarbonate), and mixtures thereof.

13. A process in accordance with claim 9 wherein styrene monomer and butadiene monomer, n-hexylmethacrylate monomer, or n-butylmethacrylate monomer are present in an amount of between about 80:20 and about 95:5 by weight; the weight proportion of water to the combination of monomers being between about 0.3:1 and about 2:1; the weight of initiator of benzoyl peroxide being between about 0.5 percent to about 10 percent by weight of the combination of total monomers; and the weight of initiator (0,0-butyl-0 (2-ethylhexyl) monoperoxy-carbonate) being between about 0.5 percent to about 5 percent by weight of the combination of monomers.

14. A process in accordance with claim 10 wherein styrene monomer and butadiene monomer, n-hexylmethacrylate monomer, or n-butylmethacrylate monomer are present in an amount of between about 80:20 and about 95:5 by weight; the weight proportion of water to the combination of monomers being between about 0.3:1 and about 2:1; the weight of initiator of benzoyl peroxide being between about 0.5 percent to about 10 percent by weight of the combination of total monomers; and the weight of initiator (0,0-t-butyl-0 (2-ethylhexyl) monoperoxy-carbonate) being between about 0.5 percent to about 5 percent by weight of the combination of monomers.

15. A process in accordance with claim 2 wherein the purity of the toner polymer is about 100 percent.

16. A process in accordance with claim 2 wherein pigment particles are added to the molten polymer present in the reaction vessel, followed by melt mixing.

17. A process in accordance with claim 2 wherein toner additives of carbon black, magnetite, charge control agent, and wax are added to the polymer melt present in the reaction vessel, followed by melt mixing.

18. A process in accordance with claim 2 wherein there is selected a mixture of from 2 to about 20 monomers.

19. A process in accordance with claim 2 wherein the polymerization initiator is benzoyl peroxide, TBEC (0,0-t-butyl-0(2-ethylhexyl) monoperoxy-carbonate), lauryl peroxide, 1-1-(t-butylperoxy)-3,3,5-trimethylcyclohexane, n-butyl-4,4-di-(t-butylperoxy)valerate, dicumyl peroxide, 2,2'-azodimethylvaleronitrile, 2,2'-azoisobutyronitrile, azobiscyclohexanenitrile, or 2-methylbutyronitrile.

20. A process in accordance with claim 2 wherein the amount of water added is about 40 percent.

21. A process in accordance with claim 1 wherein water is added in an amount of about 40 percent with stirring wherein from about 40 to about 80 percent by weight of monomer or monomers are added to the reaction vessel, which monomer or monomers are premixed with initiator thereby forming a dispersion of the monomer or monomers and initiators of oil droplets not miscible with water, and which droplets contain no surfactant and no stabilizer; and maintaining the reaction vessel temperature at about 140° C. to about 180° C. while adding pigment, followed by melt mixing for from about 15 minutes to about 5 hours to disperse the pigments in the polymer product formed; and subsequently cooling and isolating the toner.

* * * * *